United States Patent [19]

Combs

[11] 3,707,910

[45] Jan. 2, 1973

[54] OPTICAL BAR CODE SERIAL PRINTER

[75] Inventor: Ollah Combs, Morrow, Ohio

[73] Assignee: The National Cash Register Company, Dayton, Ohio

[22] Filed: June 30, 1970

[21] Appl. No.: 51,071

[52] U.S. Cl. ..................101/93 C, 101/102, 101/198, 101/332

[51] Int. Cl. ...........B41f 1/44, B41j 5/44, B41j 33/00

[58] Field of Search........101/93, 102, 193, 196, 198, 101/336, 288, 292; 197/1; 235/61.9, 61.11 E, 61.11 F; 340/146.3 K

[56] References Cited

UNITED STATES PATENTS

| | | | |
|---|---|---|---|
| 3,340,983 | 9/1967 | Halverson | 197/1 R |
| 3,481,446 | 12/1969 | Burkhardt et al. | 101/102 X |
| 3,194,154 | 7/1965 | McKeag | 101/288 |
| 2,899,132 | 8/1959 | Orthuber | 93/34 UX |
| 2,065,690 | 12/1936 | Gould et al. | 101/336 X |
| 3,537,392 | 11/1970 | Ikuss | 101/198 |
| 3,471,684 | 10/1969 | Berezor | 235/61.11 E |
| 3,406,628 | 10/1968 | Le Gauct | 101/336 X |
| 1,825,821 | 10/1931 | Rosenthal | 101/198 |

*Primary Examiner*—J. Reed Fisher
*Attorney*—Albert L. Sessler, Jr., Elmer Wargo, Harry W. Barron and J. T. Cavender

[57] ABSTRACT

A printing apparatus for recording data according to a predetermined code on a record medium. The apparatus includes first and second recording stations and a feed mechanism for successively feeding the record medium thereto in equal increments so as to provide equally-spaced recording locations on the medium. First and second indicia (like stripes printed in first and second colors) are recorded on the record medium at the appropriate recording locations in conformity with the code. One surface of the medium is used for a third indicium, and the first and second indicia are recorded thereon in the form of parallel stripes. Data to be recorded on the medium are entered on a keyboard whose output is fed to logic circuitry which controls printing apparatus at the first and second recording stations, and the feed mechanism. The code used is of the transition type, which uses three different indicia. Each succeeding indicium on the record medium is always different from the next preceding one, so as to eliminate the need for a separate clocking pulse on the medium.

2 Claims, 6 Drawing Figures

INVENTOR
OLLAH COMBS

BY Louis A. Kline
Albert L. Sessler
Elmer Wargo
THEIR ATTORNEYS

OLLAH COMBS

BY Louis A Kline
Albert L Sesslep
Elmer J Wargo
THEIR ATTORNEYS

INVENTOR
OLLAH COMBS

BY Louis A Kline
Albert L Jessup
Elmer L Vargo
THEIR ATTORNEYS

INVENTOR
OLLAH COMBS

BY Louis A. Kline
Albert L. Sessler Jr.
Elmer J. Wargo

THEIR ATTORNEYS

OPTICAL BAR CODE SERIAL PRINTER

CROSS REFERENCE TO RELATED APPLICATION

This application is related to the application of Richard E. Graham for Control Means For An Optical Bar Code Serial Printer Ser. No. 51,149, which related application was filed on the same date as this application and is assigned to the same assignee as this application.

BACKGROUND OF THE INVENTION

This invention relates to an apparatus for recording data on a record medium.

The record medium produced by the apparatus of this invention may be used in semi-automatic, mark-sensing systems for check-out counter applications in super-markets and retail department stores, credit card and inventory control applications, and the like. The record medium may be attached to an item to be sold, for example, and the medium is read during the sale thereof by a hand-held, optical probe scanner which is "scribed" or glided across the medium. One optical probe scanner is shown in U.S. Pat. No. 3,238,501, issued Mar. 1, 1966, on the application of Stephen M. F. Mak and Alfred S. Tauber.

The record medium produced by the apparatus of this invention utilizes three different indicia, with a first and second indicia being recorded on one surface of the record medium, which surface is utilized for the third indicium. The finished form of the record medium in one embodiment thereof utilizes printed stripes of first and second colors which are printed in parallel relationship on one surface of the record medium. The coded record medium uses transitions of colors to define a binary logic state like a "1" or a "0" rather than use a first color to always define a first binary state, and a second color to always define a secondary binary state, as is done in the prior art. The use of transitions of color on the record medium obviates the need for a separate clocking arrangement thereon and considerably reduces the size of the record medium compared to those of the prior art.

Because of the transition code, certain problems were encountered in the design of a printer apparatus which would print a record medium according to the code. The chief problem was to produce a printer apparatus which could produce the record media at relatively low cost. Another problem was to design a printer apparatus which would accurately print the record media according to the code at a rapid rate while overcoming somewhat severe registration problems. The printer apparatus of the present invention solves these problems, and makes an economical use of "color ribbons" which are used to print the first and second colors.

SUMMARY OF THE INVENTION

This invention relates to a printing apparatus for recording data on a record medium according to a predetermined code. The apparatus includes a first recording means having a first recording station and being adapted to record a first indicium on the medium. A second recording means, having a second recording station, is also included for recording a second indicium on the medium. Transport means are utilized for moving the record medium to the first and second recording stations, successively. The record medium is moved to these stations in equal increments by the transport means, so as to provide a plurality of equally-spaced recording locations on the medium. The recording stations are spaced apart a predetermined number of printing locations, so as to enable simultaneous printing of both indicia for a portion of a printing cycle for producing one record medium. Control means are also included for energizing the transport means and for selectively energizing the first and second recording means so as to record the first and second indicia at the respective first and second recording stations according to the code when the associated recording location on the record medium is positioned thereat by the transport means. The control means may include conventional logic circuitry to convert data input (entered on a keyboard) into energizing pulses for the first and second recording means.

DETAILED DESCRIPTION OF THE PREFERRED EMBODIMENT

Figure 1:
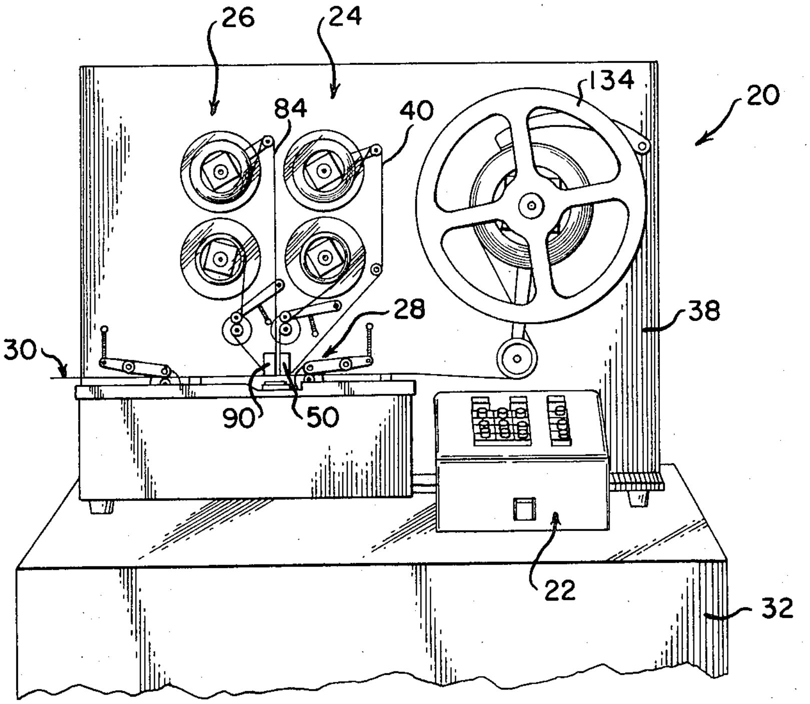
FIG. 1 is a general elevational view of the printing apparatus of this invention showing a keyboard for entering data in decimal form and first and second recording means for printing first and second indicia on a record medium.

FIG. 1 is a general elevational view of the printer apparatus of this invention, which is designated generally as 20. The apparatus 20 broadly includes a keyboard 22, upon which input data are entered; first and second recording means 24 and 26, respectively; transport means 28, for moving a record medium 30 successively to said first and second recording means; and control means housed in a cabinet 32 for controlling the operation of the transport means, and the first and second recording means, so as to record data on the record medium in conformance with a predetermined code.

Figure 3:
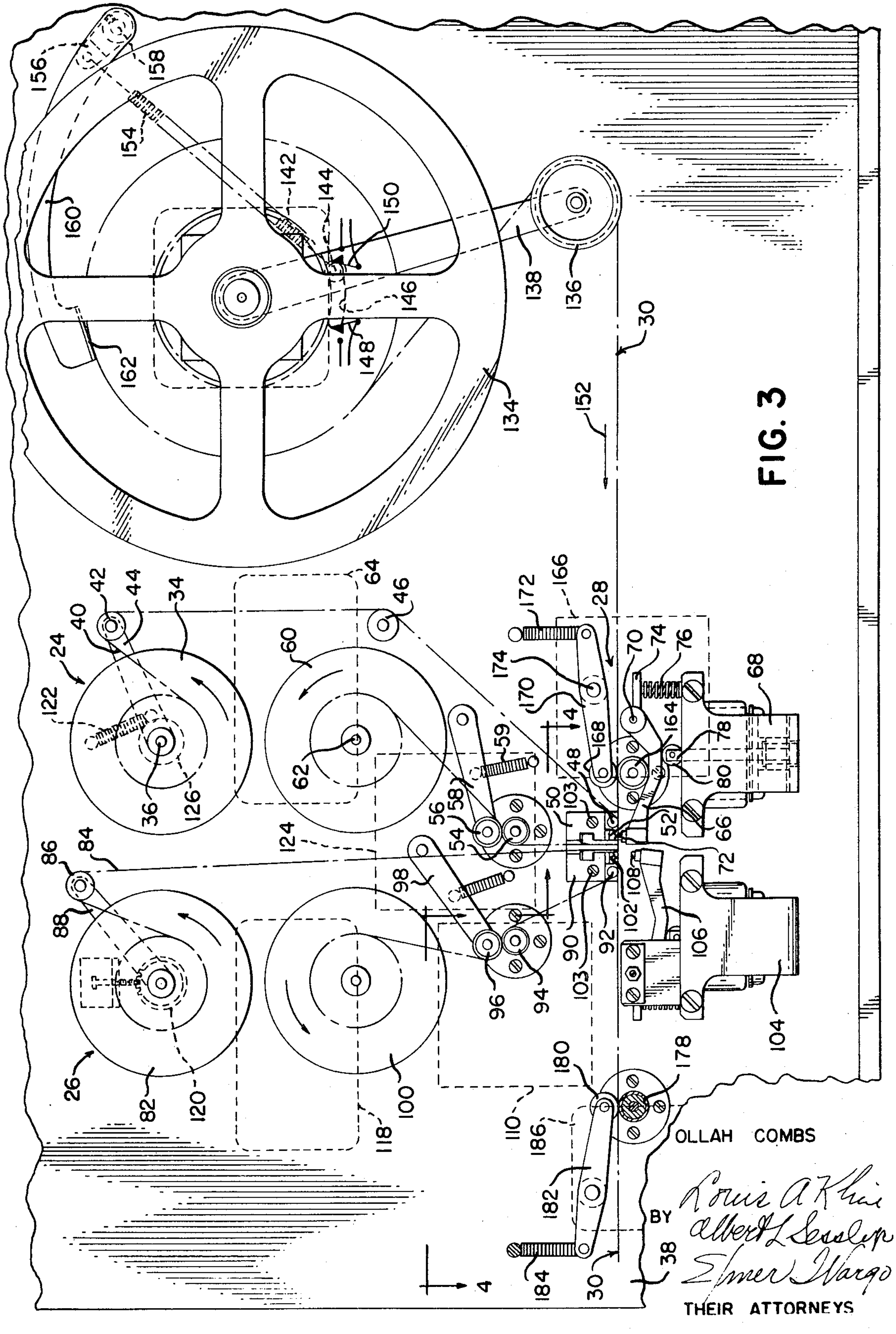
FIG. 3 is an enlarged elevational view of a portion of FIG. 1 showing additional details of the first and second recording means and their associated print stations.

The first recording means 24 is best shown in FIG. 3 and includes a supply reel 34 rotatably supported on a shaft 36 extending from a vertical wall 38 secured to the cabinet 32. In one embodiment, an inked ribbon 40 for producing a first indicium (a green color) is fed from the reel 34 and is routed over a roller 42, which is rotatably mounted on an arm 44, which is pivotally mounted on the shaft 36. The ribbon 40 is routed over another roller 46, which is rotatably supported on the wall 38, and a third roller 48, rotatably supported on a first print station 50, which is secured to the wall 38.

The ribbon passes beneath a print bar 52 and over a capstan 54, which is rotatably mounted on the wall 38. A pinch roller 56 is rotatably mounted on one end of an arm 58, the remaining end of which is pivotally mounted on the wall 38. A spring 59 is used to urge the roller 56 and the ribbon 40 against the capstan 54 to keep a resilient tension on the ribbon 40 as it is wound up on a take-up reel 60, which is secured to a shaft 62, which is driven by a conventional take-up drive clutch 64, shown in dashed outline.

The first recording means 24 also includes a print hammer means which comprises a print hammer 66 and an actuating solenoid 68. The print hammer 66 is pivotally joined to the wall 38 by a pin 70 and has a flat area 72 (on one side of the pin 70) adapted to strike the print bar 52, and an extension 74 located on the opposite side of the pin 70. A spring 76, compressively loaded, is positioned between the extension 74 and the frame of the solenoid 68 and is used to pivot the print hammer 66 counter-clockwise (as viewed in FIG. 3) to an inoperative position, in which the flat area 72 is moved away from the print bar 52. When the solenoid 68 is energized (by control means to be later described), its operating plunger 78, with roller 80 attached, forces the print hammer 66 to rotate clockwise against the bias of the spring 76, causing the flat area 72 to impact against the print bar 52 to effect printing.

The second recording means 26 is also shown in FIG. 3 and is constructed in the same manner as the first recording means 24; therefore, a detailed description of the second recording means 26 need not be given. The second recording means 26 includes a supply reel 82 for supplying a ribbon 84 for producing a second indicium (a black color), which ribbon is routed over a roller 86 mounted on an arm 88, under a second print station 90 and a roller 92, over a capstan 94, around a pinch roller 96 rotatably mounted on an arm 98 (which resiliently urges the roller 96 against the capstan 94), and to the take-up reel 100. The second print station 90 has a print bar 102, which is spaced from the print bar 52 a predetermined distance which will be later explained, and these stations are provided with adjustment screws like 103 (which are threaded in the vertical wall 38) to provide adjustability in the spacing between the print bars 52 and 102. The first and second print stations 50 and 90 have a space between them enabling the ribbons 40 and 84 to be threaded therebetween.

The print hammer means associated with the second recording means 26 includes a solenoid 104 and a print hammer 106, which are identical to their counterparts associated with the first recording means 24. When the solenoid 104 is energized, the flat area 108 on the print hammer 106 will strike the print bar 102 to effect printing.

Figure 4:
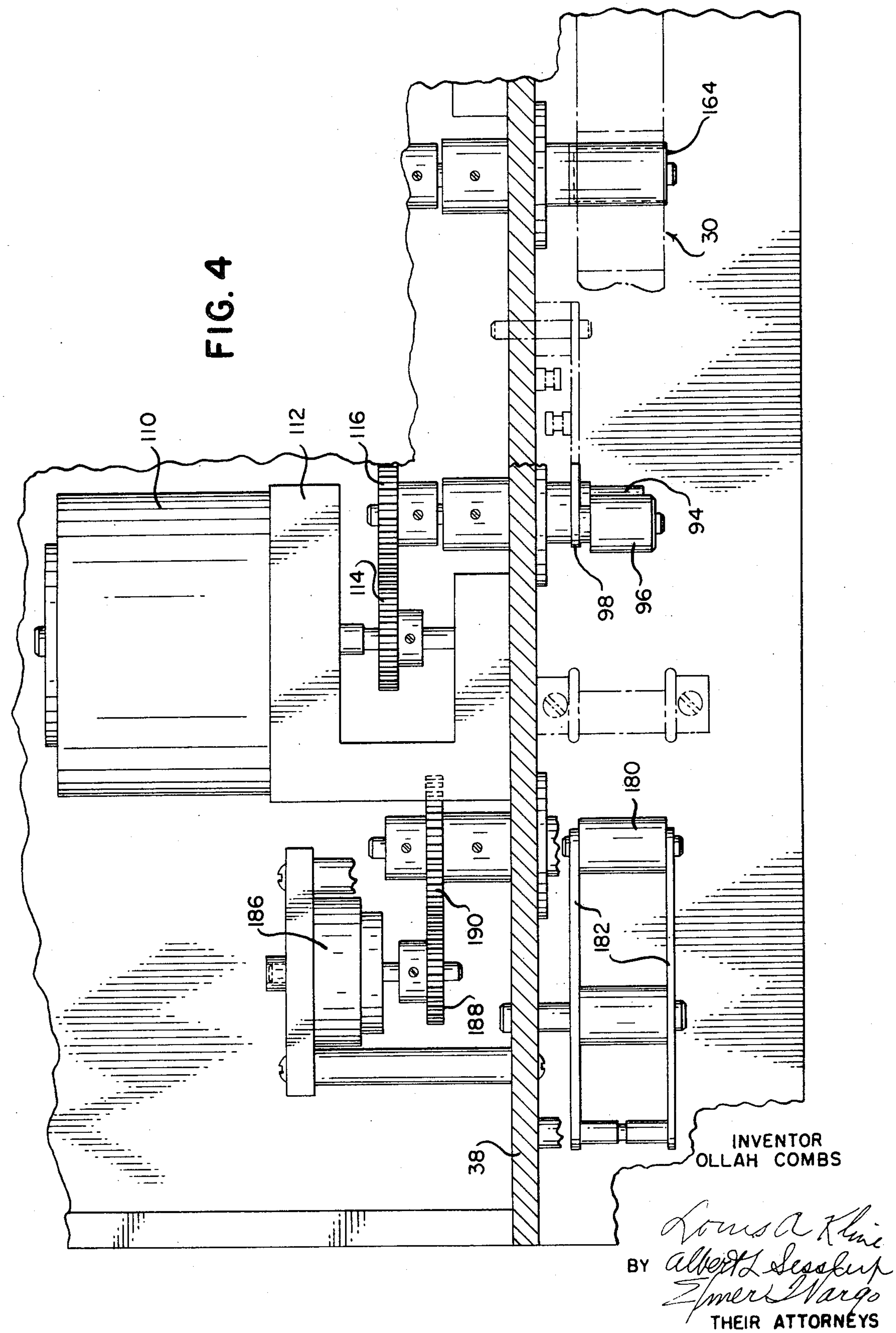
FIG. 4 is an enlarged, plan view, partly in cross-section, showing additional details of the first and second recording means, including drive means therefor, and is taken along the line 4—4 of FIG. 3.

The drive means for moving the first and second ribbons 40 and 84 to their respective recording stations 50 and 90 are shown in FIGS. 3 and 4. A conventional stepping motor 110, which is secured to the vertical wall 38 by a bracket 112, is used to incrementally rotate the capstan 94 through conventional gearing (like the gears 114 and 116), selected so as to obtain the desired incremental feed of the second ribbon 84. A conventional take-up drive clutch 118 (shown as a dashed rectangle in FIG. 3) is utilized to wind the used ribbon 84 on the take-up reel 100. A conventional slip clutch 120 (FIG. 3) is also utilized to provide some tension on the ribbon 84 between the supply reel 82 and the associated capstan 94. As the capstan 94 feeds the ribbon 84, the arm 88 is pivoted clockwise (as viewed in FIG. 3) against the bias of a spring (like the spring 122, shown on the arm 44) until the tension on the ribbon 84 overcomes the drag torque of the slip clutch 120, permitting the reel 82 to rotate, thereby supplying more ribbon to the loop of ribbon maintained by the arm 88. The arm 88 performs the function of isolating the inertia of the supply reel 82 from the drive capstan 94. The drive means for the first ribbon 40 operates in the same manner as that just described for feeding the second ribbon 84, and includes a conventional stepping motor 124, the take-up drive clutch 64, and a conventional slip clutch 126.

Figure 2:
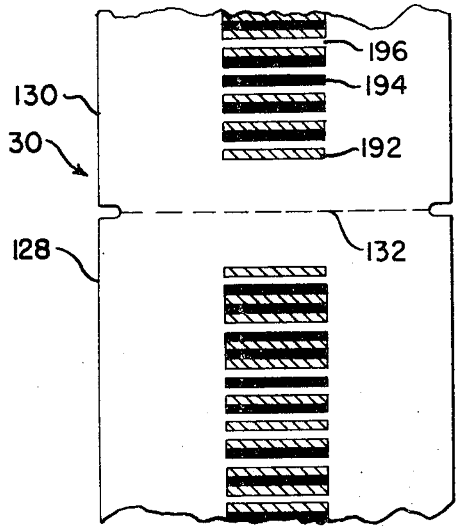
FIG. 2 is a plan view of portions of two adjoining record media which are printed by the apparatus shown in FIG. 1.
Figure 5:
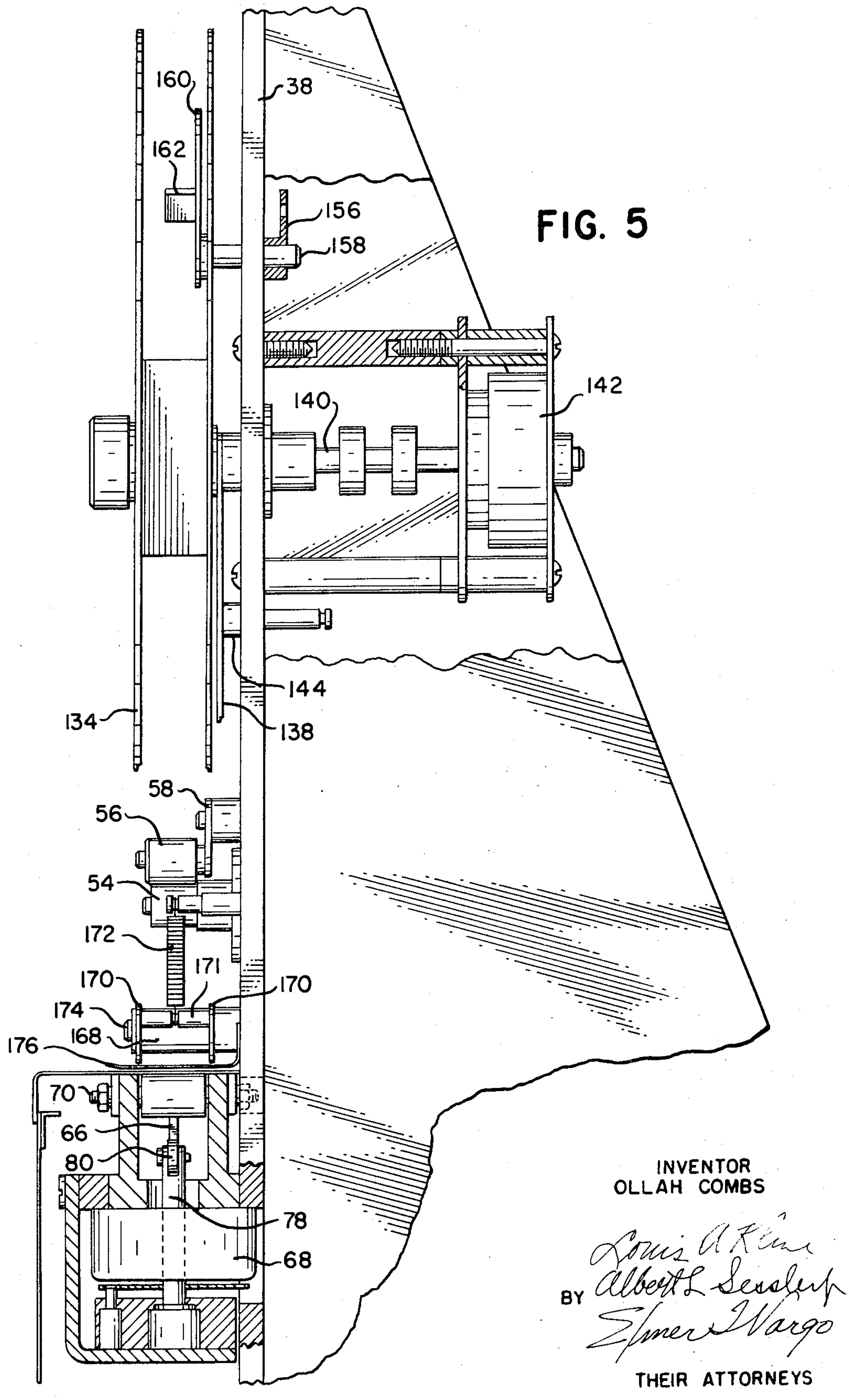
FIG. 5 is an enlarged end view of the apparatus as seen from the right side of FIG. 3.

The transport means 28 for moving the record medium 30 is shown principally in FIGS. 3, 4, and 5. In one embodiment of the invention, the record medium 30 consists of a plurality of labels like 128 and 130 (FIG. 2), which are joined together in the form of a tape and perforated (as at 132) to facilitate their separation into individual labels after printing. The record medium or tape 30 is fed from a supply reel 134, which is supported on the vertical wall 38. From the reel 134, the tape 30 is routed over a roller 136, which is rotatably mounted on one end of an arm 138, the remaining end of which is pivotally mounted on a shaft 140 (FIG. 5). The shaft 140 is fixed to the reel 134 and is driven by a motor 142 when a supply of tape 30 is needed. The arm 138 has a stud 144 located between its ends, and the stud 144 passes through an arcuately-shaped recess 146 located in the vertical wall 38. Limit switches 148 and 150 (shown only diagrammatically in FIG. 3) are used to control the energization and deenergization of the motor 142. As the tape is pulled during use in the direction of the arrow 152 (FIG. 3), the arm 138 is rotated clockwise (as viewed in FIG. 3) against the bias of a spring 154 secured to the stud 144, until the stud engages the limit switch 148 to close it. Closing the switch 148 energizes the motor 142, which rotates the reel 134 counter-clockwise, increasing the loop of tape 30 around the roller 136, which enables the spring 154 to rotate the arm counter-clockwise, permitting the stud 144 to engage the remaining limit switch 150 to deenergize the motor 142. The motor 142 holds the reel 134 in a fixed position until it is rotated thereby. The spring 154, which has one end secured to the stud 144, has the remaining end secured to a stud secured to the wall 38. One end of an arm 156 (FIG. 3) is fixed to a shaft 158. The remaining end of the arm 156 is secured to a spring (not shown), which urges it to rotate counter-clockwise as viewed in FIG. 3. The shaft 158 is rotatably mounted in the wall 38, is restrained from axial movement therein, and has secured thereto one end of an arcuately-shaped arm 160 (FIG. 3). The remaining end of the arm 160 has a flat area 162, which resiliently engages the tape 30 in the reel 134, due to the urging of the spring associated with the arm 156.

The record medium or tape 30 is fed to the first and second recording means 24 and 26 by a pair of capstans and pinch rollers (FIG. 3). The first capstan, 164, located upstream from the first and second printing stations 50 and 90, respectively, is incrementally driven by a conventional stepping motor 166 (shown only as a dashed rectangle in FIG. 3). A pinch roller 168, rotatably mounted on a shaft supported between the ends of a pair of arms 170, is used to force the tape 30 against the capstan 164 to effect the feeding thereof. The arms 170 are pivotally mounted between the ends thereof on a pin 174, which is secured to the wall 38, and the remaining ends of the arm 170 are joined together by a stud 171 (FIG. 5), to which a spring 172 is secured to resiliently urge the arms counterclockwise (as viewed in FIG. 3) about the pin 174. A guide 176 (FIG. 5) is used to guide the tape 30 to the first capstan 164.

A second capstan 178 and pinch roller 180, located downstream from the first and second printing stations 50 and 90, respectively, are used to facilitate the feeding of the tape past the printing stations. The pinch roller 180 is supported between a pair of arms 182 (similar to the arms 170) and is resiliently urged against the capstan 178 by a spring 184. The capstan 178 is driven by a conventional motor 186 (shown only as a dashed rectangle in FIG. 3). The speed of the motor 186 is such that it rotates the capstan 178 sufficiently fast so as to provide a slight tension on the tape 30. It was discovered that keeping a slight tension on the tape 30 improves the registration of the "bars" printed at the first and second printing stations 50 and 90, respectively. The motor 186 drives the capstan 178 through a series of gears 188 and 190 (FIG. 4).

In one embodiment of the invention, the width of bars of color like the bars 192 and 194 (FIG. 2) was 0.015 inch, as measured along the direction of travel of the tape 30 under the printing stations 50 and 92. In one embodiment, the first capstan 164 was driven at a rate of 125 increments per second. The bars, like the bars 192, are printed in a green color by the first recording means 24, and the bars like the bars 194 are printed in a black color by the second recording means 26. The bars like the bars 196 are produced by utilizing the background of the label 130, which is white, and by indexing the tape an incremental amount of 0.015 inch without either the first or the second recording means being energized. The first and second ribbons 40 and 84 are fed past their respective printing stations 50 and 90, respectively, in increments of 0.020 inch whenever the associated print hammers 66 and 106 are actuated, in order to insure that an unused portion of the ribbons is available for printing the color bars. The apparatus of this invention makes economical use of the color ribbons, in that a particular ribbon is advanced only as a color bar of that particular color is printed, instead of advancing a length of ribbon which is commensurate with the length of the label being printed.

The particular ribbons selected for use in this invention were ribbons coated with a wax-like ink which is transferred to the tape 30 by the mechanical impacting of the print hammers 66 and 106. The particular indicia selected for the particular apparatus for recording data are, of course, dependent upon particular design requirements. Obviously, colors other than green, black, and white may be printed, as well as other types of indicia, like luminescent or phosphorescent indicia, may be printed by the apparatus of this invention. Some indicia printed require a "fixing" process to prevent the indicia printed from smudging when handled. The "fixing" process may be effected by conventional techniques, as, for example, heating the label after printing to "fix" the ink.

Figure 6:
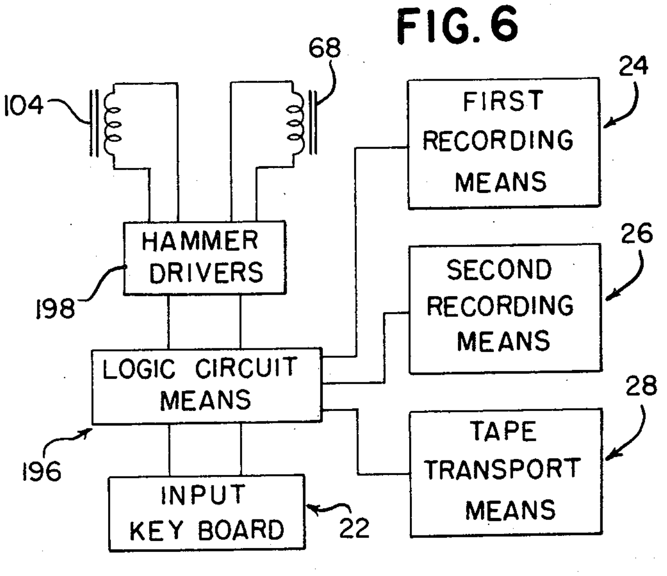
FIG. 6 is a general schematic diagram of a control means which may be used with the printer apparatus.

FIG. 6 is a general block diagram of the control means used in this invention. As previously generally stated, the data to be recorded on the labels is entered upon the keyboard 22, and the output therefrom is routed to a conventional logic circuit means designated generally as 196. The logic circuit means 196 controls the energization of the first recording means 24, the second recording means 26, and the record transport means 28, already described. Additional outputs from the logic circuit means 196 are routed to hammer drivers 198, which energize the appropriate solenoids 68 and 104 of the first and second printing stations 50 and 90.

Because the control means may be conventional, they are not shown here in detail. A detailed description of a logic circuit means which may be used may be found in the related copending United States patent application previously mentioned. A conventional manually-operated control means utilizing simple, manually-operated switches may be used to actuate the first and second recording means 24 and 26, respectively, the tape transport means 28, and the solenoids 68 and 104, so as to print the desired color bars in the appropriate recording locations on the record medium 30.

What is claimed is:

1. An apparatus for recording data in the form of aligned, rectangular parallel color bars on a record medium according to a predetermined code, comprising:

- a first recording means having a first recording station for recording a first color bar on said medium, and including a first rectangularly-shaped printing bar located at said station;
- a second recording means having a second recording station for recording a second color bar on said medium, and including a second rectangularly-shaped printing bar located at said second recording station;
- said first and second printing bars having identical lengths and widths and being aligned with the lengths thereof being parallel to each other and with said printing bars being stationary and spaced apart a distance equal to at least one multiple of the width of said printing bars;
- transport means for contacting and moving said record medium to said first and second recording stations successively along a direction which is perpendicular to the lengths of said printing bars, and for moving the record medium thereto in equal increments with each said increment being equal in width to the width of one of said printing bars so as to provide equally spaced recording locations thereon, with each recording location being identical in size and shape to said printing bars;
- said first recording means also including a first ribbon supply means for supplying a first color ribbon to said first recording station, and a first hammer platen for striking said first printing bar when the first recording means is actuated to print said first color bar on said record medium;

said second recording means also including a second ribbon supply means for supplying a second color ribbon to said second recording station, and a second hammer platen for striking the second printing bar when the second recording means is actuated to print said second color bar on said record medium; and control means for energizing said transport means and for selectively energizing said first and second recording means so as to record said first and second color bars at their respective first and second recording stations according to said code when the associated recording location of the record medium is positioned thereat by said transport means.

2. The apparatus as claimed in claim 1 in which said first and second printing bars have adjustable means for spacing them close together but at least one recording location apart to enable simultaneous printing by said first and second hammer platens for a portion of a printing cycle for producing one record medium;

said first and second color ribbons being threaded between said first and second printing bars; and said first and second ribbon supply means having means for incrementally feeding the associated first and second color ribbons an incremental distance slightly greater than the width of the corresponding printing bar each time the associated first and second recording means is actuated so as to present unused portions of said first and second ribbons to said first and second recording stations.

* * * * *